(12) United States Patent
Redecker

(10) Patent No.: US 8,126,815 B2
(45) Date of Patent: Feb. 28, 2012

(54) METHOD AND SYSTEM FOR CARRYING OUT VERIFICATION PROCESSES INCLUDING OPTICAL SCANNING OF INFORMATION DISPLAYED VIA A MOBILE TELEPHONE TERMINAL

(75) Inventor: Bernd Redecker, Lübbecke (DE)

(73) Assignee: Siemens IT Solutions and Services GmbH, Munich (DE)

( * ) Notice: Subject to any disclaimer, the term of this patent is extended or adjusted under 35 U.S.C. 154(b) by 1587 days.

(21) Appl. No.: 10/499,767

(22) PCT Filed: Dec. 17, 2002

(86) PCT No.: PCT/DE02/04617
§ 371 (c)(1),
(2), (4) Date: Jun. 21, 2004

(87) PCT Pub. No.: WO03/052707
PCT Pub. Date: Jun. 26, 2003

(65) Prior Publication Data
US 2005/0107067 A1 May 19, 2005

(30) Foreign Application Priority Data

Dec. 19, 2001 (DE) .................................. 101 62 531

(51) Int. Cl.
*G06Q 20/00* (2006.01)
(52) U.S. Cl. ................ 705/65; 705/64; 705/67; 705/75; 705/76; 235/379; 235/380
(58) Field of Classification Search .................. 235/380, 235/379; 455/406, 407; 705/64, 65, 67, 705/75, 76
See application file for complete search history.

(56) References Cited

U.S. PATENT DOCUMENTS

| | | | | |
|---|---|---|---|---|
| 6,169,890 | B1 * | 1/2001 | Vatanen | 455/406 |
| 6,614,987 | B1 * | 9/2003 | Ismail et al. | 386/291 |
| 6,694,200 | B1 * | 2/2004 | Naim | 700/94 |
| 6,868,426 | B1 * | 3/2005 | Mankoff | 1/1 |
| 6,877,661 | B2 * | 4/2005 | Webb et al. | 235/462.01 |
| 6,915,271 | B1 * | 7/2005 | Meyer et al. | 705/14.35 |
| 7,031,947 | B1 * | 4/2006 | Bingeman et al. | 705/77 |
| 7,168,615 | B2 * | 1/2007 | Smith | 235/380 |
| 7,209,903 | B1 * | 4/2007 | Mamdani et al. | 705/75 |
| 7,349,552 | B2 * | 3/2008 | Levy et al. | 382/100 |

(Continued)

FOREIGN PATENT DOCUMENTS

DE        197 54 384        6/1999

(Continued)

*Primary Examiner* — Mamon Obeid

(74) *Attorney, Agent, or Firm* — King & Spalding L.L.P.

(57) ABSTRACT

The invention relates to the carrying out of verification processes with regard to authorization of user and/or payment processes by means of a mobile telephone terminal, whereby an identifier associated with an authorized user and/or payer is provided in such a way that it can be called up and represented on a display device of a mobile telephone terminal associated with the authorized user and/or payer. On the instructions of the authorized user and/or payer, the identifier is represented on the display device and optically scanned in an interrogation station. A control message with a request for confirmation of a process verifying the authorization of use and/or payment process is transmitted to the mobile telephone terminal. In order to grant use and/or carry out payment, the control message receives a reply by transmitting a confirmation message from the mobile telephone terminal to the interrogation station.

4 Claims, 3 Drawing Sheets

U.S. PATENT DOCUMENTS

| | | | |
|---|---|---|---|
| 7,532,941 B2 * | 5/2009 | Hale et al. | 700/83 |
| 7,630,986 B1 * | 12/2009 | Herz et al. | 1/1 |
| 7,636,691 B2 * | 12/2009 | Maari | 705/51 |
| 7,740,171 B2 * | 6/2010 | Kingsborough et al. | 235/383 |
| 7,864,933 B2 * | 1/2011 | Ryoo | 379/114.2 |
| 2001/0007983 A1 * | 7/2001 | Lee | 705/69 |
| 2001/0051915 A1 * | 12/2001 | Ueno et al. | 705/39 |
| 2002/0023027 A1 * | 2/2002 | Simonds | 705/26 |
| 2002/0065839 A1 * | 5/2002 | McCulloch | 707/200 |
| 2002/0082986 A1 * | 6/2002 | Lu | 705/39 |
| 2004/0129777 A1 * | 7/2004 | Smith | 235/380 |
| 2004/0243517 A1 * | 12/2004 | Hansen | 705/64 |
| 2005/0086164 A1 * | 4/2005 | Kim et al. | 705/40 |

FOREIGN PATENT DOCUMENTS

| | | |
|---|---|---|
| EP | 1 231 578 | 8/2002 |
| GB | 2362070 | 11/2001 |
| WO | WO 02/15062 | 2/2002 |
| WO | WO 02/29738 | 4/2002 |

* cited by examiner

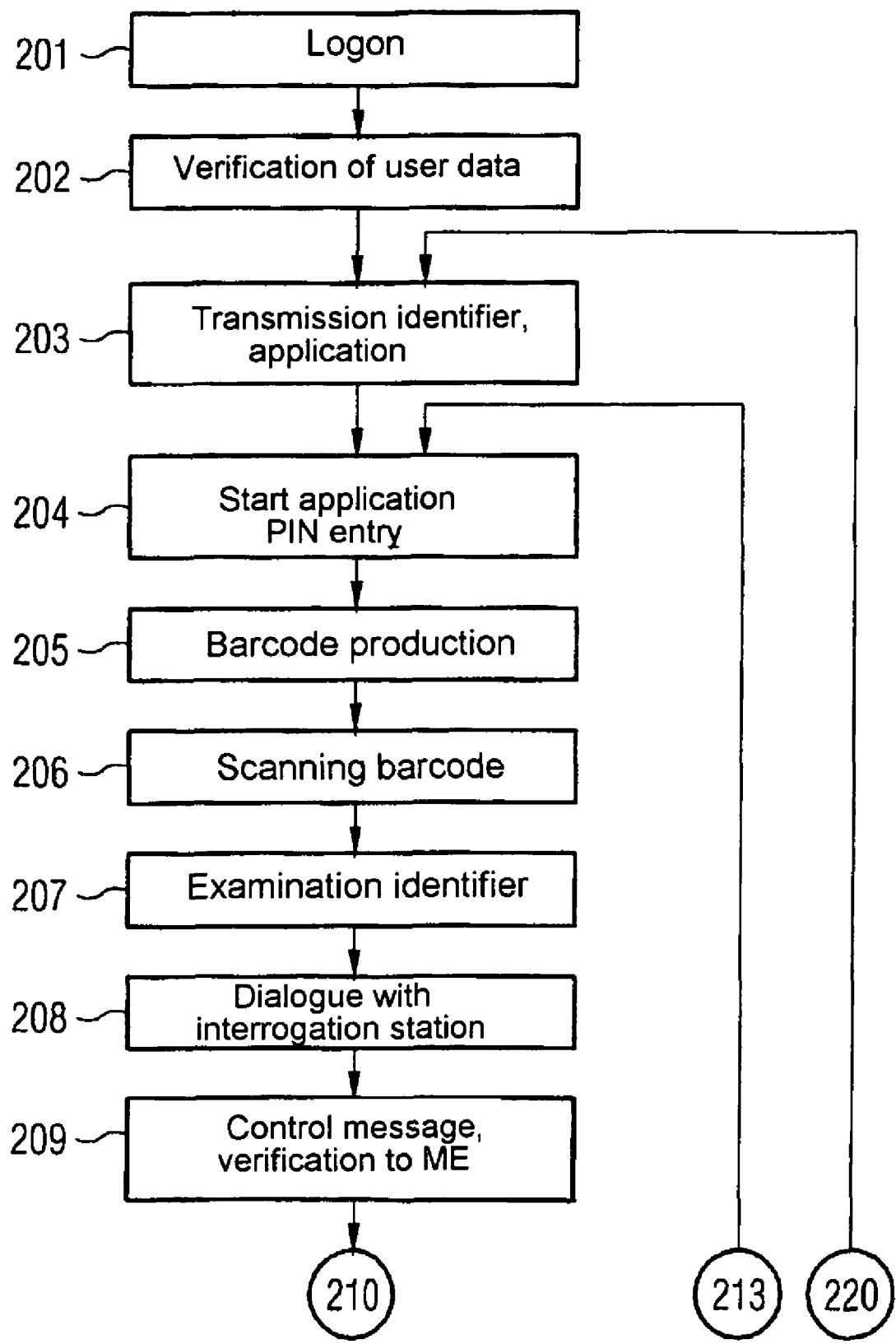

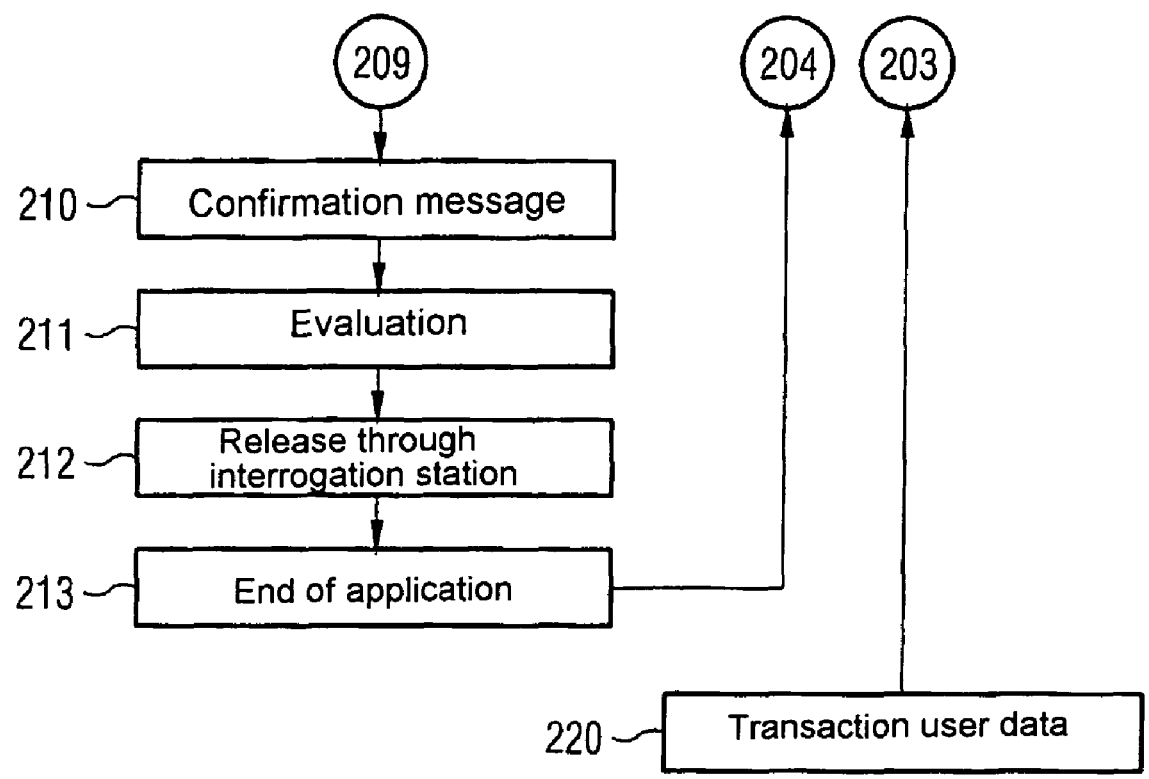

METHOD AND SYSTEM FOR CARRYING OUT VERIFICATION PROCESSES INCLUDING OPTICAL SCANNING OF INFORMATION DISPLAYED VIA A MOBILE TELEPHONE TERMINAL

BACKGROUND OF THE INVENTION

To date, a number of approaches have been developed for using mobile telephones to carry out verification processes with regard to authorization of use and or payment processes. An example of this is disclosed in DE 199 03 822 A1 wherein a method for carrying out cashless payments via a mobile telephone is described. In this method, a sum of money to be paid and an identification of a SIM-card (Subscriber Identity Module) of the mobile telephone are read into a vendor terminal. An infra-red interface between the mobile telephone and the vendor terminal is recommended to transmit the identification of the SIM-card into the vendor terminal. After importation into the vendor terminal, the sum of money to be paid and the identification of the SIM-card, along with the identification of the vendor terminal, are transmitted to a matching device and examined. A positive examination result effects the opening of a transaction. Subsequently, transaction data is transmitted to the mobile telephone in order to interrogate a confirmation message. A confirmation message of the transaction data records the transaction and the transaction data is transmitted to the account administering device.

However, the method described is more suitable to a small amount of transaction data. In other words, payment processes are time-consuming as a result of the type of connection structures deployed for the initiation and confirmation of payment transactions between mobile telephones, vendor terminals and matching devices. In this respect, critical applications are, for example, the payment process at the supermarket checkout, which is inadequately covered by the method disclosed in DE 199 03 822 A1.

The present invention is therefore directed to a method and a system for carrying out verification processes with regard to authorization of use and or payment processes via a mobile telephone terminal, which considerably reduces the time taken for the verification process with regard to authorization of use and implementation of cashless payment transactions and specifies suitable system components to achieve such method.

SUMMARY OF THE INVENTION

According to the present invention, the duration of the verification processes with regard to authorization of use and the implementation of cashless payment transactions is considerably reduced by optically scanning an identifier associated with an authorized user and/or payer, at an interrogation station, and via a direct transmission of a confirmation message from a mobile telephone terminal of the authorized user and/or payer in the interrogation station. Optical scanning of the identifier avoids delays resulting from the infra-red transmission which are contingent on the compatibility problems between the affected components and on an agreement about a transmission protocol to be used. Direct transmission of confirmation messages to the interrogation station typically does away with a diversion via a matching device which causes an additional delay when the confirmation message is sent to the interrogation station. The provision of a control message transmitted to the mobile telephone terminal enables a prompt evaluation of the confirmation message in the interrogation station.

Furthermore, the identifier does not necessarily have to represent a SIM-card identifier, but it also can be an ID card, a credit card, a customer number or similar. In this way, the method according to the present invention can be easily implemented in the most varied of application environments. For example, the mobile telephone terminal can be a conventional mobile telephone, an electronic assistant/appointment calendar, a communicator, an organizer, a Palm-PC or another type of mobile terminal with a radio send/receive module. For example, the interrogation station can be applied to any type of cash desk system, pay point, access control system or mobile terminal for operating personnel within public transport systems.

Additional features and advantages of the present invention are described in, and will be apparent from, the following Detailed Description of the Invention and the Figures.

BRIEF DESCRIPTION OF THE FIGURES

FIGS. 2a-b show a flow diagram for carrying out verification processes with regard to authorization of use and/or payment processes with a mobile telephone terminal.

DETAILED DESCRIPTION OF THE INVENTION

Figure 1:
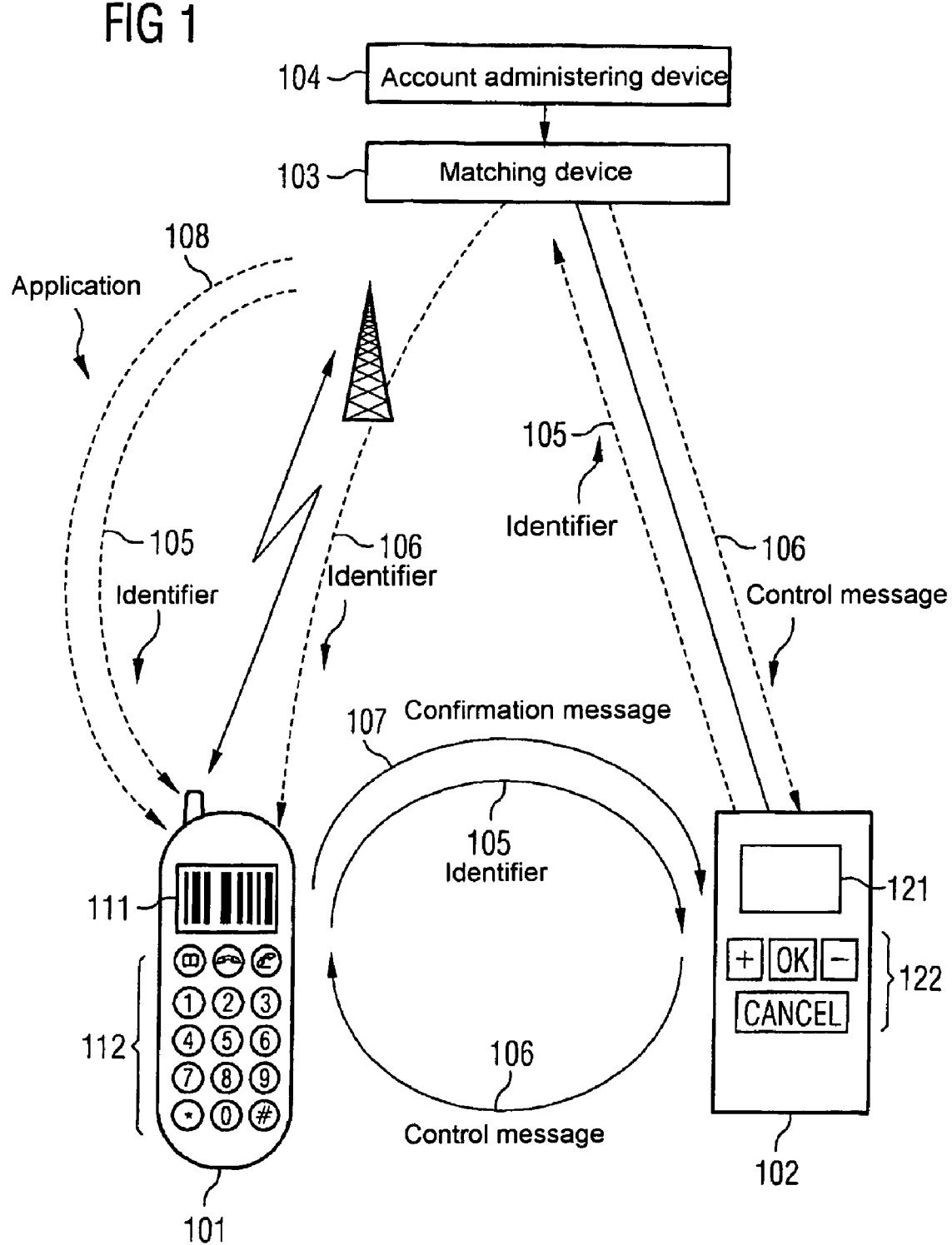
FIG. 1 shows an arrangement with a mobile telephone terminal, an interrogation station, a matching device and an account administering device.

FIG. 1 shows an arrangement of a mobile telephone terminal 101, an interrogation station 102, a matching device 103 and an account administering device 104. The mobile telephone terminal 101 is associated with an authorized user and/or payer whereas the interrogation station 102 is associated with a service provider or a vendor. The mobile telephone terminal 101 includes display device 111 and control element 112. Text and graphics information can be displayed on the display device 111. This type of text and/or graphics information can be recorded via an optical scanning device 121 (scanner). The interrogation station 102 includes the control elements 122 to control the user and/or application dialogs.

A starting point for the method described below for carrying out verification processes with regard to authorization of use and/or payment processes is the registration of an authorized user or payer as an operator of a verification process with regard to authorization of use and or payment system. This corresponds to Step 201 within the flow diagram in FIG. 2. After registration, the user data collected during the registration (step 202) is verified. Successful verification enables identifier 105 associated with an authorized user and/or payer and an application 108 to be transmitted to the mobile telephone terminal 101 of the authorized user and/or payer (Step 203). For example, identifier 105 and application 108 are transmitted from matching device 103 of the verification process with regard to authorization of use and payment system operator to the mobile telephone terminal 101.

Application 108 is essentially a control program for mobile telephone terminal 101 which, when run, executes the steps described below performed in mobile telephone terminal 101. Correspondingly, the interrogation station 102 is provided with a control program which is run by a microprocessor in interrogation station 102 which is not shown in any greater detail in the diagram.

Transmitted application 108 is initiated on the instructions of the authorized user and/or payer. During the start of application 108, a PIN number is interrogated for authentication (Step 204). Subsequently, a bar code is produced from identifier 105 which can be called-up and shown on display device 111 of mobile telephone terminal 101 (Step 205). Subsequently, the barcode is scanned in the interrogation system 102 (Step 206), and identifier 105, transmitted via the barcode, is examined (Step 207). The examination of identifier 105 can be effected directly through the interrogation station 102. Alternatively, identifier 105 can be transmitted to the matching device 103 and examined on the basis of the database entries stored therein.

In the case of successful examination, a user/application dialog is offered as an option with the interrogation station 101 (Step 208), for example, for selecting a user/payment option. Subsequently, in the case of successful examination of the identifier 105, control message 106 is transmitted with a request for verification and confirmation of a verification process with regard to authorization of use and/or payment process to the mobile telephone terminal 101 (Step 209). The control message can, for example, be transmitted from matching device 103 to mobile telephone terminal 101 via radio interface. An alternative is a transmission of the control message 106 via a Bluetooth connection from the interrogation station 102 to the mobile telephone terminal 101. This alternative enables a particularly rapid execution sequence.

In order to grant use and/or carry out payment, control message 106 receives a reply by transmitting a confirmation message 107 from mobile telephone terminal 101 to the interrogation station 102 (Step 210). The response can either occur on the instructions of the authorized user and/or payer, or automatically via the mobile telephone terminal 101. Confirmation message 107 is represented either on display device 111 of the mobile telephone terminal 101 as a barcode and scanned optically in the interrogation station 102, or is transmitted via a Bluetooth connection from mobile telephone terminal 101 to the interrogation station 102.

A particularly rapid method execution sequence is produced if control message 106 is provided substantially at the same time as its transmission to the mobile telephone terminal 101 in interrogation station 102. In this case, an evaluation of the confirmation message 107 can take place at an early stage in the interrogation station 102 (Step 211). With this type of evaluation, the control message 106 and confirmation message 107 are compared in the simplest of cases for attributes which agree with or match each other.

A positive evaluation result effects a release to grant use and/or carry out payment via interrogation station 102 (step 212). Finally, application 108 running on mobile telephone terminal 101 terminates (Step 213) and can be started again.

During implementation of a payment process, the evaluation result, together with payment transaction data, can be transmitted to the matching device 103 in accordance with step 211. Depending on the type of evaluation result, a corresponding payment transaction is either rejected or recorded. During the recording of the payment transaction, the payment transaction data is forwarded to account administering device 104 in order to trigger the accounting process.

A direct implementation of the previously described method is possible on a JAVA-compatible mobile telephone terminal 101. This is done by installing the application 108 on mobile telephone terminal 101. Biometric user characteristics can be used to protect application 108 from unauthorized access as an alternative to protection by a user PIN number.

Further implementations of the previously described method via WAP or SMS variations such as EMS and MMS can be technically achieved. With a WAP implementation, instead of application 108, a URL is transmitted to the mobile telephone terminal 101 for access to a corresponding WAP server and the barcode is generated by a WAP server.

For the previously described method, the usage scenarios described below are possible without in any way restricting the general applicability of the method.

Scenario 1: Cash Desk at Venue (Exhibition, Cinema, Concert)

The above-mentioned application is installed on a customer's mobile telephone terminal. The application is started, the customer enters his/her PIN number and the mobile telephone terminal generates a unique barcode. This barcode is scanned at an interrogation station within the entrance area of the venue. In this way, a customer identifier is established. A server linked to the interrogation station examines whether the customer has booked and/or paid for the event in question. After the transmission and evaluation of the control and confirmation message, the customer is admitted where appropriate.

Scenario 2: Railways/Local Rapid Transit Rail Links

The customer starts the application on his/her mobile telephone terminal and enters his/her user PIN number. The mobile telephone terminal generates a unique barcode. The customer holds his/her mobile telephone terminal in front of an optical scanning device of a ticket machine and the scanning device records the barcode. Finally, the customer identifier is determined from the recorded barcode. The customer identifier and the booking information supplied by the customer are stored on a central server linked to the ticket machine. At ticket inspection, the barcode recorded on the mobile telephone terminal is displayed once again. By accessing the central server, a match with the booking information and a ticket cancellation is effected.

Scenario 3: Gas Station

A pay point can be found in a gas station, where a mobile telephone terminal can be used. The customer starts the application on his/her mobile telephone terminal and enters his/her PIN number. The mobile telephone terminal produces a unique barcode. The customer holds his/her mobile telephone terminal in front of an optical scanning device in the pay point, whereby the barcode is recorded and the customer identifier is determined. Finally, a dialog is initiated with the customer which determines at which pump he/she is located and the amount of fuel he/she requires. This data is summarized as payment transaction data and is transmitted via a control message to the customer's mobile telephone terminal. Subsequently, the customer is able to confirm the payment transaction by responding to the control message with a confirmation message which, in turn, is transmitted to the pay point. A positive evaluation resulting from a comparison of control and confirmation messages causes the pay point to release the requested pump for a selected payment amount and the customer is thus able to dispense the fuel.

Scenario 4: Discount System

A discount system represents a special scenario. In this case, as a result of minor safety requirements, there is no need to even transmit control and confirmation messages. Manipulation tests are of no use here since a possible discount, at most one-third, is not credited to the customer at the interrogation station. Thus, the customer has no motivation to manipulate the system at the interrogation station.

The aforementioned scenarios serve to illustrate that in the simplest of cases the only function of an interrogation station is to scan the barcode and transmit/forward the scanned result.

Although the present invention has been described with reference to specific embodiments, those of skill in the art will recognize that changes may be made thereto without departing from the spirit and scope of the present invention as set forth in the hereafter appended claims.

The invention claimed is:

1. A method for carrying out verification processes with regard to authorization of payment processes via a mobile telephone terminal, the method comprising the steps of:
   providing an identifier, which can be called-up and is associated with a particular party who is at least one of an authorized payer, for display on a display device of a mobile telephone terminal associated with the particular party;
   displaying the identifier on the display device and optically scanning the identifier at an interrogation station on instructions of the particular party;
   upon successful identification of the scanned identifier, transmitting to the mobile telephone terminal a control message from the interrogation station or from a matching device in communication with the interrogation station, the control message including a request for confirmation of an authorization of a payment process; and
   in response to receiving the control message at the mobile telephone terminal, the mobile telephone terminal automatically displaying a confirmation message on the display device of the mobile telephone terminal and optically scanning the displayed confirmation message at the interrogation station;
   evaluating, by the interrogation station, the control message and the scanned confirmation message;
   in response to a positive evaluation, authorizing said payment process;
   such that the payment process requires two separate optical scans of different information displayed on the mobile telephone terminal display device at the interrogation station, namely, the optical scan of the identifier displayed on the mobile telephone terminal display device and the additional, separate optical scan of the confirmation message displayed on the mobile telephone terminal display device, wherein both optical scans are performed during the payment process at the interrogation station.

2. A method for carrying out verification processes as claimed in claim 1, wherein the control message is provided in the interrogation station substantially at the same time as the transmission of the control message to the mobile telephone terminal, and the confirmation message is evaluated in the interrogation station.

3. A method for carrying out verification processes as claimed in claim 1, wherein the control message is transmitted via a Bluetooth connection from the interrogation station to the mobile telephone terminal.

4. A system for carrying out verification processes with regard to authorization of payment processes, comprising:
   a mobile telephone terminal associated with a particular party who is an authorized payer;
   an interrogation station; and
   wherein the interrogation station is programmed to transmit a control message to the mobile telephone terminal requiring confirmation of a verification process with regard to an authorization of a payment process in the mobile telephone terminal;
   wherein the mobile telephone terminal comprises:
      a display device programmed to display an identifier which is associated with the particular party, the displayed identifier being optically scanable by the interrogation station during the payment process;
      a receiving device programmed to receive the control message from the interrogation station upon successful identification of the scanned identifier; and
      wherein the display device is further programmed to automatically display a confirmation message in response to receiving the control message, the displayed confirmation message being optically scanable by the interrogation station during the payment process;
   and wherein the interrogation station comprises an optical scanning device programmed to scan (a) the identifier represented on the display device and (b) the confirmation message represented on the display device as two separate optical scans during the payment process at the interrogation station;
   wherein the interrogation station is further programmed to evaluate the control message and the scanned confirmation message;
   in response to a positive evaluation, the interrogation station is further programmed to authorize said payment process.

* * * * *